D. A. CUTTLE.
SPEED AND DISTANCE RECORDING DEVICE.
APPLICATION FILED JULY 29, 1915.

1,234,880.

Patented July 31, 1917.
2 SHEETS—SHEET 1.

WITNESS
O. Johnson

INVENTOR
David A. Cuttle

BY
C. D. Haskins
ATTORNEY

D. A. CUTTLE.
SPEED AND DISTANCE RECORDING DEVICE.
APPLICATION FILED JULY 29, 1915.
1,234,880.
Patented July 31, 1917.
2 SHEETS—SHEET 2.
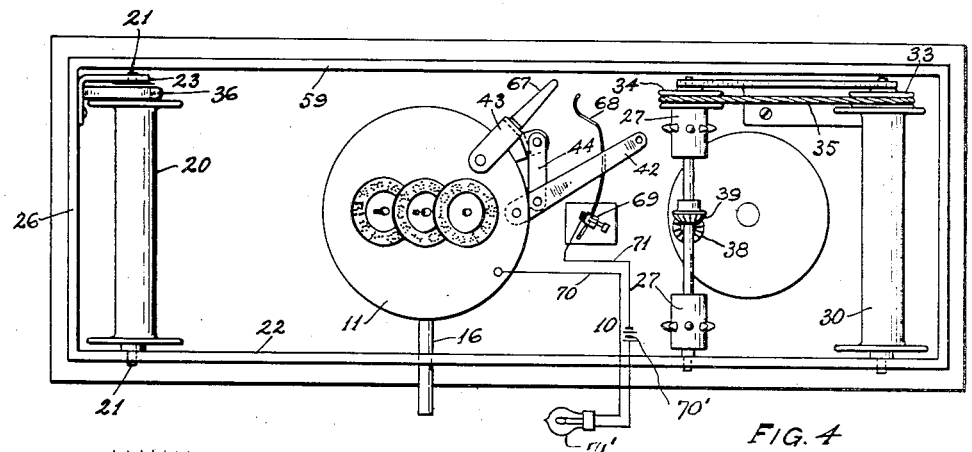
FIG. 4
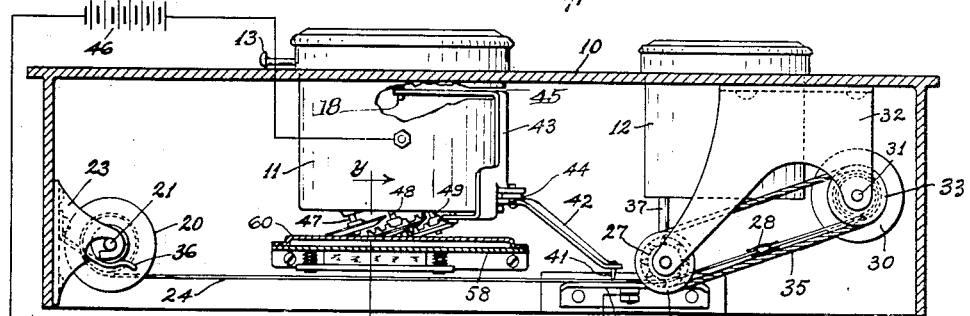
FIG. 5
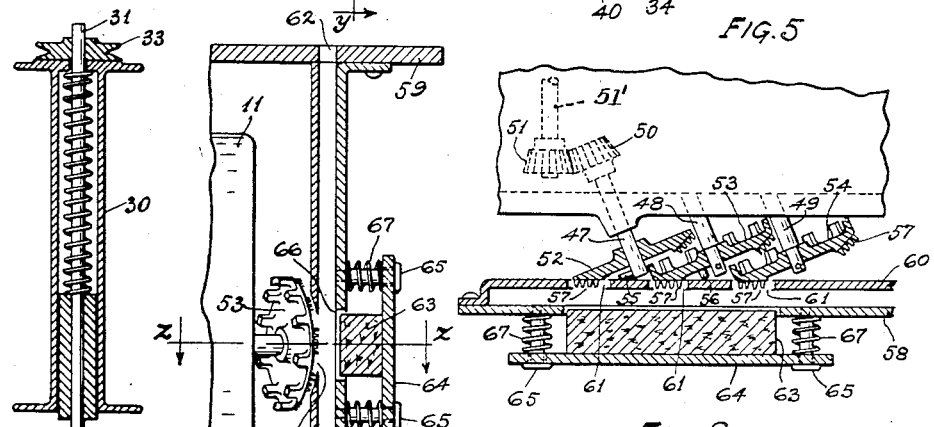
FIG. 6
FIG. 7
FIG. 8
WITNESS
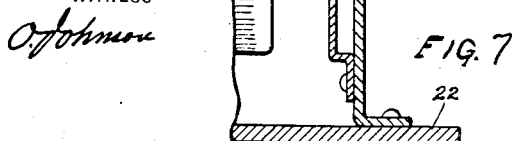
INVENTOR
David A. Cuttle
BY
C. D. Haskins
ATTORNEY

UNITED STATES PATENT OFFICE.

DAVID A. CUTTLE, OF SEATTLE, WASHINGTON.

SPEED AND DISTANCE RECORDING DEVICE.

1,234,880.  Specification of Letters Patent.  Patented July 31, 1917.

Application filed July 29, 1915. Serial No. 42,629.

*To all whom it may concern:*

Be it known that I, DAVID A. CUTTLE, a citizen of the United States, residing at Seattle, in the county of King and State of Washington, have invented a certain new and useful Improvement in Speed and Distance Recording Devices, of which the following is a specification.

My invention relates to improvements in speed and distance recording devices for vehicles and the object of my invention is to provide a recording device which shall be adapted to be associated with the running gear of a vehicle and which shall operate to make a graphic record on a strip of paper which shall indicate the periods of time during which such vehicle was in operation, the distance traveled during each of such periods of time, the rate of speed at which such vehicle was moving at any instant within any of such periods of time, and the periods of time during which said vehicle was at rest, and which recording device shall be further adapted to be manually actuated at any time to print in figures on the record strip of paper the number of miles traveled since the mechanism was last set at the zero point; and to permit the removal, at desired times, of any portion or portions of the record strip of paper upon which a record has been made.

A further object of my improvement is to provide a recording device in such association with a combined speedometer and odometer and a clock as will adapt the apparatus thus associated to be disposed in a vehicle so that the dials of such combined speedometer and odometer and clock shall be visible to the driver thereof.

Figure 1:
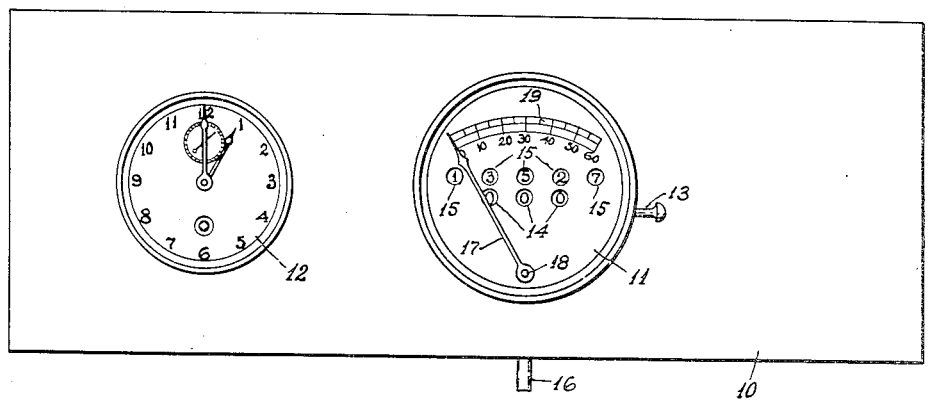
Figure 2:
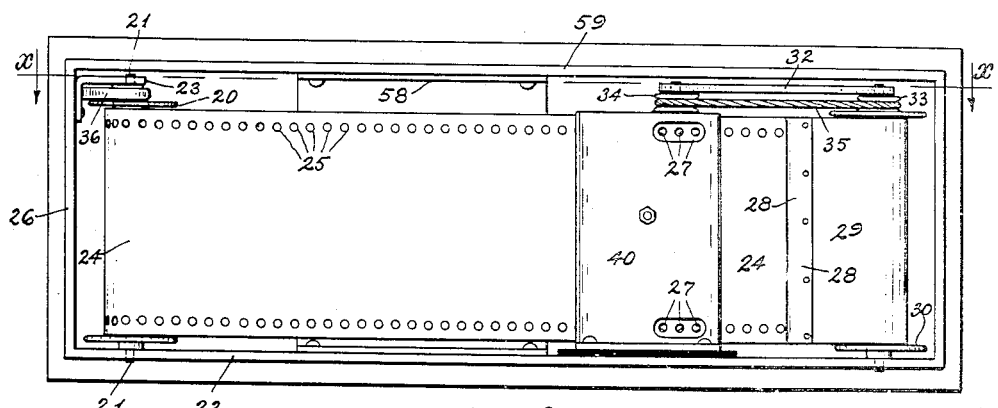
Figure 3:
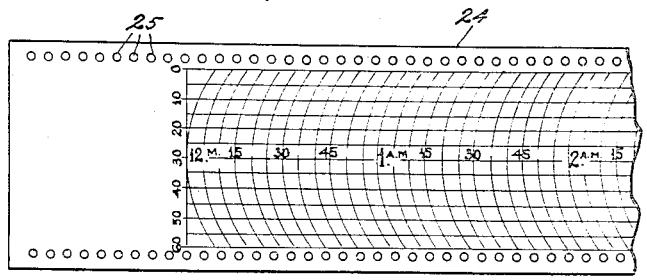

I attain these objects by devices illustrated in the accompanying drawings wherein Figure 1 is a view in front elevation of a structure embodying my invention; Fig. 2 is a view of the same in rear elevation with the back wall and some parts removed; Fig. 3 is a fragmentary view of a strip of paper as prepared for use in the operation of making records thereon; Fig. 4 is another view in rear elevation of the structure of Figs. 1 and 2 with other additional parts removed and showing a signal lamp and circuit which may be used; Fig. 5 is a view of the same, in association with an electric circuit, in horizontal section on broken line $x, x$ of Fig. 2 with the casing of the combined speedometer and odometer broken away; Fig. 6 is an enlarged view in vertical mid-section of a detail of the same; Fig. 7 is an enlarged view of other details of the same in vertical section on broken line $y, y$ of Fig. 5; and Fig. 8 is a view in horizontal section on broken line $z, z$ of Fig. 7, showing relative position of certain parts of my invention.

Referring to the drawings, throughout which like reference numerals indicate like parts, 10 represents the front wall of an inclosing case through which projects the face of a combined speedometer and odometer 11 and a clock 12, which combined speedometer and odometer and clock are of well known form of construction, the combined speedometer and odometer 11 being provided with a projecting plunger 13 which in a well known manner may be pressed inwardly when it is desired to set the wheels containing the figures in the lower row of three holes 14 to zero at the time of the initial operation of the vehicle with which the device may be associated.

The characters exposed in the upper row of holes 15 are provided on the peripheries of wheels of a well known form of combined speedometer and odometer mechanism not shown, and such characters serve to show the total number of miles traveled by a vehicle since the time when the wheels upon which they are fixed were set at the zero point.

The internal mechanism of the combined speedometer and odometer 11 is adapted, in a well known manner, to be connected with the running gear of a vehicle by means of a downwardly projecting shaft 16 whereby such mechanism may be operated in response to the travel of such vehicle.

The pointer 17 is mounted upon a shaft 18 which is actuated by a well known form of combined speedometer and odometer mechanism (not shown) to make rotative movements through circumferential distances that are proportional to the velocity of the vehicle to which the combined speedometer and odometer is attached whereby the pointer 17 will point to that division on a scale 19 which will indicate, in a well known manner, the rate of velocity in miles per minute at which the vehicle is moving at any instant of time.

In Fig. 5, by a view in horizontal section on broken line $x, x$ of Fig. 2, I have shown the relative positions of the combined speedometer and odometer 11, the clock 12 and some of the parts associated therewith, which parts comprise a spool 20 that is removably mounted on a shaft 21 which is rotatably disposed in bearings formed in the bottom wall 22 and in a bracket 23 secured to the end wall 26, (as more clearly shown in Fig. 4) and upon the spool 20 is disposed a roll of paper 24 whose opposite edge portions are provided each with rows of holes 25, as shown in Figs. 2 and 3, said paper 24 being extended from the spool 20 in a plane parallel with the back of the inclosing case to engage rows of holes 25 with a sprocket roller 27 whose rotary movement will move the paper 24 to unroll from the spool 20 in an obvious manner, said paper 24 being extended from the sprocket roller 27 to be releasably secured by a clip 28 to one end of a strip of cloth 29 whose other end is attached to a winding spool 30 that is frictionally mounted upon a shaft 31.

The upper end of the shaft 31 and the upper end of the shaft of the sprocket roller 27 find bearings in a bracket 32 secured to the front wall 10 while the lower ends thereof find bearings in the bottom wall 22 of the inclosing case, and mounted on the upper end of each of said shafts are grooved wheels 33 and 34, respectively, and disposed on said wheels 33 and 34 to extend therebetween is a belt 35 which may serve to communicate rotary motion from the shaft of the sprocket roller 27 to the shaft 31 whereby the paper 24 will be rolled onto the spool 30 always at a speed as great as the speed at which the sprocket roller 27 may move said paper 24 to unroll it from the spool 20.

In order that a certain tension may be exerted on the paper 24 during its movement from the spool 20 to the spool 30, thus to prevent any slackness thereof, I have provided a friction spring 36 disposed to bear on the upper end of the shaft 21.

The sprocket roller 27, in its operation, is rotated at a constant rate of speed per hour (to move the paper 24 at a constant rate of speed corresponding to the divisions of time printed thereon, as indicated in Fig. 3) by means of the clock 12 from the rear end of which projects the suitable one of its shafts 37 upon which is mounted a beveled gearwheel 38 which is disposed to engage with a like beveled gearwheel 39 that is mounted on the central portion of the shaft of the sprocket roller 27 as more clearly shown in Fig. 4.

Adjacent to the sprocket roller 27 is disposed an insulated metal plate 40 that is secured to the bottom wall 22 of the inclosing case, which plate 40 engages its front surface with a portion of the rear surface of the paper 24 to extend upwardly from the bottom to the top edge thereof and to form a platen for supporting the paper 24 against the slight pressure of a marking device 41 that is fixed on the outer end of a lever 42 which projects outwardly through a slot in the side of the cylindrical metal casing of the combined speedometer and odometer 11 within which casing its other end is pivoted on a line equi-distant from the upper and lower edges of the paper 24 thus to adapt said lever 42 to swing the marking device 41 between the lower portion and the upper portion of the paper 24 while said marking device 41 is in engagement with the front surface of said paper 24, the rear surface of which paper 24 being in engagement with the plate 40, and said lever 42 may be actuated to make such swinging movements by a U-shaped lever 43 which is operatively connected with said lever 42 by a link 44, one arm of said U-shaped lever 43 being pivoted on the outside of the rear wall of the combined speedometer and odometer 11 while its other arm projects through a slot 45 in the cylindrical wall of the combined speedometer and odometer 11 to be pivoted therebetween at a point corresponding to the point at which its opposite arm is pivoted.

The lever 43 is operatively associated with mechanism, not shown, which serves to actuate the shaft 18 of the pointer 17, whereby the lever 42 and said pointer 17 will be actuated to swing simultaneously throughout corresponding angular distances in response to the travel of the vehicle with which the apparatus is associated; such distances always varying proportionally with variations in the velocity of said moving vehicle, thus to cause the marking device 41 to swing downwardly from a zero line adjacent to the top edge of the paper 24 for a distance proportional to the velocity of the moving vehicle. The lever 43 may be connected to shaft 18, as indicated in Fig. 5, to be actuated thereby.

The marking device 41, I have shown as a metal point, between which point and the plate 40 a current of electricity may be caused to flow from a battery 46, one terminal of which is connected with said plate 40, and the other terminal of which is connected to the cylindrical casing of the combined speedometer and odometer 11, which casing is in metallic connection with said marking device 41, and the paper 24 is treated chemically to cause it to conduct a current between the plate 40 and the marking device 41 and to cause it to be closed by any current passing through it between such plate 40 and said marking device 41; but such marking device 41 may, if it be desired, comprise a lead pencil or a suitable pen of a kind well known.

Projecting obliquely outwardly through the rear wall of the combined speedometer and odometer 11 is a shaft 47 and two fixed studs 48 and 49, and the shaft 47 by means of gear wheels 50 and 51 and shaft 51' is associated with the driving shaft, within the combined speedometer and odometer 11, which actuates the three wheels upon which are fixed the characters that may be exposed through the holes 14 of the dial of the combined speedometer and odometer 11 and upon the outwardly projecting end of the shaft 47, and upon each of the studs 48 and 49 is mounted a beveled wheel, as wheels 52, 53 and 54, the wheel 52 being fastened on the shaft 47 to rotate therewith, while the wheels 53 and 54 are adapted to rotate freely on the studs 48 and 49, respectively, as shown more clearly in Fig. 8.

Projecting from the rims of the inner sides of each of the wheels 53 and 54 are ten equally spaced integral lugs, and on the end of the shaft 47 is a pin 55 which is adapted to engage with successive ones of said lugs on the wheel 53 upon each revolution of said shaft 47, and upon said wheel 53 is a pin 56 which is adapted to engage successively with different ones of said lugs on the wheel 54 whereby ten revolutions of the shaft 47 will cause the wheel 53 to make one revolution and the wheel 54 to make one tenth of a revolution in a well known manner.

Upon the beveled portion of each of the wheels 52, 53 and 54 are fixed pins 57 arranged to represent ten characters comprising a zero and the figures from one to nine inclusive, which pins 57 of each character are adapted to penetrate a paper to perforate such paper with holes arranged in the form of such characters, and the characters on each of the wheels 52, 53 and 54, thus formed of perforating pins, are disposed in circumferential positions that correspond to the circumferential positions on the wheels within the combined speedometer and odometer 11 upon which are fixed the characters which may be exposed through the holes 14.

The exact operation and arrangement of parts of my invention will be more clearly understood upon reference to U. S. patents to J. W. Jones, Nos. 1,005,845 and 1,028,220. In these patents, shafts 46 are for the same purpose as shaft 16 of this application, and the mechanism which actuates shafts 114 of the first-mentioned of said patents is equivalent to that which actuates shaft 51' of the present device, it being understood that wheels 52, 53 and 54 of the present device receive motion in the same general manner as do the disks 113 of said patent. In the second-mentioned of said patents, shaft 74 corresponds to shaft 18 of the present device and lever 43 being actuated in the same general manner as the pointer 76 of this patent, said lever will obviously be moved to actuate the marker 42 as described. These patents show the general type of combined speedometer and odometer which is utilized and indicated by 11 in the drawings, and the details of the connections of lever 43 and shaft 51' with the internal mechanism of said combined speedometer and odometer are only broadly indicated and described, as changes in such details may be necessary to adapt the present invention for use in connection with the various types of such devices which exist.

In the rear of the combined speedometer and odometer 11 between the wheels 52, 53 and 54 and the back wall of the inclosing case is a vertically disposed plate 58 extending from the bottom wall 22 to the top wall 59 of the inclosing case to which it is secured, as more clearly shown in Fig. 7, and between such plate 58 and the wheels 52, 53 and 54 is another plate 60 disposed parallel with and spaced from said plate 58, and extending through said plate 60 are openings 61 disposed each one opposite the beveled rim of a different one of the wheels 52, 53 and 54, through which openings 61 the different characters formed by pins may project; and through the top wall 59 is a slotted opening 62 through which a portion of a strip of paper, as paper 24, may be projected downwardly between the plates 58 and 60 to a point below the wheels 52, 53 and 54 whereby said portion of paper may be in a position to be perforated by the pins of any characters on the wheels 52, 53 and 54 that may be at the time projected within said openings 61.

In order to effect the perforation of a paper when so disposed, I have provided a press-pad 63 that is secured to a bar 64 that is mounted on studs 65 to be movable sidewise thereon in a direction toward the wheels 52, 53 and 54 to project the press-pad 63 through an opening 66 in the plate 58 to press said paper against the pointed devices forming a character in an obvious manner, said press-pad 63 being of soft material to permit the points of the character to penetrate it to some degree after they have passed through said paper.

Normally the press-pad 63 is maintained in its rearwardmost position by helical compression springs 67 thus to be free from engagement with the wheels 52, 53 and 54.

As shown in Fig. 3, the strip of paper 24 may be marked with a plurality of longitudinal lines representing miles traveled by an automobile, as, for instance, the top line in Fig. 3 may represent zero while the bottom line may represent sixty miles, the eleven intermediate lines each representing five miles, and said strip of paper 24 is also marked with transversely disposed curved lines the spaces between which represents divisions of time, the length of the spaces between such curved lines being proportional to the speed at which the paper 24 is moved by the sprocket roller 27.

In Fig. 3, I have shown the strip of paper 24 as divided by transverse lines of such distance apart that the spaces between them represent five minutes each, in which case the clock 12 would be required to move the sprocket roller 27 at a speed that would cause the paper 24 to move in a direction from the spool 20 to the spool 30 for a distance equal to the distance from one curved line to another in five minutes time.

The curved transverse lines thus marked on the paper 24 are curved in correspondence with the curve of the path traveled by the marking device 41.

Obviously, the strip of paper 24 may be of a total length corresponding to any convenient period of time, as a day or a week or more as may be desired, and the sizes of the rollers 20 and 30 may be made to suit the desired length of the strip of paper 24.

For convenience of illustration I have marked the paper 24 in Fig. 3 with longitudinal lines spaced apart to represent a distance of five miles between adjacent lines, and the curved transverse lines are spaced to represent five minutes between adjacent lines, but in practice such divisions for representing time and miles would be undesirable, and therefore in the practical operation of my apparatus I employ strips of paper of sufficient width and length as will permit the marking of longitudinal lines spaced to represent one mile, and the marking of the curved transverse lines spaced to represent a minute of time, whereby when a record is made thereon by the marking device 41 then the intersection of the mark made by such marking device 41 with the longitudinal lines or the transverse lines will indicate accurately the particular minute at which the vehicle is traveling at the rate of a particular number of miles per minute.

In order that the driver of a vehicle may have his attention called to the fact that he is exceeding a predetermined speed I have provided adjustable means in association with the combined speedometer and odometer 11 whereby a colored electric signal lamp will be lighted when such predetermined speed is exceeded, which means I have indicated only in Fig. 4 wherein is an arm 67 attached to the U-shaped lever 43, which arm 67 in response to its swinging motion may make an electrical contact with a contact spring 68 which is adjustably clamped in an insulated bracket 69 that is secured to the front wall 10 of the inclosing case, said contact spring 68 being adapted to be clamped in a position to be engaged by the arm 67 when it swings to a point corresponding to a desired limit of speed.

A conducting wire 70 is connected with the casing of the combined speedometer and odometer 11 and a conducting wire 71 is in electrical connection with the contact spring 68, said conducting wires 70 and 71 being connected with a battery 70' and a colored electric signal lamp 71', whereby a contact of the arm 67 with the contact spring 68 will cause said electric signal lamp to be lighted, thus to indicate that a desired predetermined limit of speed is being exceeded.

The operation of the apparatus thus illustrated and described is as follows: The downwardly projecting shaft 16 of the combined speedometer and odometer 11 being operatively associated with one of the wheels of a vehicle, as long as such vehicle is at rest, the pointer 17 will remain at zero and the characters exposed through the holes 14 initially will represent zero as will also the characters opposite the opening 61 on the wheels 52, 53 and 54, the plunger 13 having been pressed inwardly to set such characters at a point representing zero.

The operation of the clock 12 will move the paper 24 at a constant rate equal to the distance between adjacent transverse curved lines each five minutes and so long as the vehicle is at rest the marking device 41 will cause the electric current of the battery 46 to make a straight line along the zero line of the paper 24, but when the vehicle commences to travel the marking device 41 will swing downwardly for a distance proportionate to the rate of speed at which the vehicle moves, for instance, if the vehicle moves at the rate of ten miles an hour the marking device 41 will move downwardly on the paper 24 to the longitudinal line representing ten miles as shown in Fig. 3, and if the speed increases above the rate of ten miles per hour such marking device 41 will swing proportionately lower and at the same time the pointer 17 will swing for a corresponding distance on the scale 19 and when the vehicle comes to a rest said needle 17 will fall back to zero and the marking device 41 will swing upwardly to the zero line on the paper 24 such paper 24 moving always constantly in response to the operation of the clock 12 irrespective of the condition of rest or movements of the vehicle.

If at the end of the day or the end of any other period of time it is desired to examine the record made on the paper 24 during such period of time and to preserve that portion of the paper 24 upon which such record is made then the strip of paper 24 may be severed at a point adjacent to the sprocket roller 27 whereupon such portion of the paper 24 may be unrolled by hand from the roller 30 and its inner end removed from the clip 28 and thereupon one end portion of it may be projected downwardly through the slot 62 to a point where its back surface may be engaged with the pointed device representing characters on the wheels 52, 53 and 54 by pressing the bar 64 to cause the press-pad 63 to force such paper 24 against such pointed devices thus to make perforated characters in such paper 24 which characters will represent the total number of miles traveled since the plunger 13 was last depressed, thus such portion of the paper 24 will contain a record of the total number of miles traveled, the time and duration of stops made by the vehicle, and the rate at which the vehicle traveled at any instant of time, and thereupon such portion of the paper 24 with its record may be filed away for future reference.

After such portion of the paper 24 has been severed and removed the clip 28 may be attached to the projecting end of the paper 24 adjacent to the sprocket roller 27 and the plunger 13 may be depressed to bring the wheels 52, 53 and 54 to the zero point and incidentally to set at zero the characters that may be exposed through the holes 14, thus to prepare the apparatus for making another record.

While I have shown no means for locking the inclosing case to make its operative parts inaccessible to an unauthorized person, it is obviously desirable that any well known means shall be employed to protect the operative parts of the structure from being tampered with by such unauthorized persons.

Manifestly, changes may be made in the forms, dimensions and arrangement of different parts of my invention without departing from the spirit thereof.

What I claim is:

1. A speed and distance recording device including a casing having a conventional combined speedometer and odometer and a conventional clock bodily inserted and supported therein, a record sheet within said casing adapted to be moved by said clock, a marker within said casing adapted to be operated by the speed responsive mechanism of said combined speedometer and odometer for recording variations of speed and the time thereof on said sheet, and means within said casing for recording distance, said means including a yieldingly mounted manually operated press pad positioned between the bottom of said combined speedometer and odometer and said record sheet, and type wheels adapted to be operated by the odometer mechanism of said combined speedometer and odometer positioned between said press pad and the bottom of said combined speedometer and odometer.

2. A speed and distance recording device including a support, a conventional combined speedometer and odometer bodily attached thereto, a pivoted lever having one end extended into the casing of said combined speedometer and odometer and adapted to be operatively connected to the speed responsive mechanism thereof, a marker actuated by said lever, a time controlled movable record sheet upon which said marker is adapted to inscribe, and means for recording distance, said means including type wheels adapted to be operatively connected to the odometer mechanism of said combined speedometer and odometer and positioned in a plane different from the plane in which said record sheet is positioned, and a press pad carried by said support adjacent said type wheels.

In witness whereof I hereunto subscribe my name this 23rd day of June, A. D. 1915.

DAVID A. CUTTLE.

Witnesses:
F. C. McINTOSH,
FRANK WARREN.